United States Patent
Meyer et al.

(10) Patent No.: US 7,877,645 B2
(45) Date of Patent: Jan. 25, 2011

(54) USE OF OPERATIONAL CONFIGURATION PARAMETERS TO PREDICT SYSTEM FAILURES

(75) Inventors: John E. Meyer, Spring, TX (US); Mark A. Wade, Tomball, TX (US); Robert R. Covington, Tomball, TX (US); Joseph P. Miller, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 540 days.

(21) Appl. No.: 11/830,802

(22) Filed: Jul. 30, 2007

(65) Prior Publication Data

US 2009/0037777 A1    Feb. 5, 2009

(51) Int. Cl.
*G06F 11/00*    (2006.01)
(52) U.S. Cl. .................................................. 714/47
(58) Field of Classification Search .................. None
See application file for complete search history.

(56) References Cited

U.S. PATENT DOCUMENTS

| | | | | |
|---|---|---|---|---|
| 5,528,516 | A * | 6/1996 | Yemini et al. ............... | 702/181 |
| 5,539,592 | A * | 7/1996 | Banks et al. ................. | 360/75 |
| 7,370,241 | B2 * | 5/2008 | Nicholson et al. ............ | 714/47 |
| 7,526,684 | B2 * | 4/2009 | Bicknell et al. .............. | 714/47 |
| 7,539,907 | B1 * | 5/2009 | Johnsen et al. ............... | 714/47 |
| 2003/0084381 | A1 * | 5/2003 | Gulick ......................... | 714/47 |
| 2004/0168108 | A1 * | 8/2004 | Chan et al. ................... | 714/47 |
| 2005/0216800 | A1 * | 9/2005 | Bicknell et al. ............. | 714/718 |
| 2008/0189578 | A1 * | 8/2008 | Raghuraman et al. ......... | 714/47 |

OTHER PUBLICATIONS

P.G. Daly, XML Basics and Benefits, Dec. 8, 2003, http://www.intranetjournal.com/articles/200312/pij_12_08_03a.html.*
Allan, G.; "The Love/Hate Relationship with DDR SDRAM Controllers," Reprint from SOCentral.com; Jul. 3, 2006; 3 p.; Tech Pro Communications; Merrimack, NH, http://soccentral.com/PrintPage.asp?PassedID=19574.
Mahajan, R.; "Memory Design Considerations When Migrating to DDR3 Interfaces from DDR2"; R&D Headline News; Copyright 2006 Design and Reuse S.A.; 5 p.; http://www.us.design-reuse.com/news?id=15699&print=yes.

* cited by examiner

*Primary Examiner*—Michael C Maskulinski

(57) ABSTRACT

The use of operational configuration parameters to predict digital system failures is described herein. At least some illustrative embodiments include a method that includes initializing a digital system (the initializing comprising determining an operational configuration of at least part of the digital system), saving the operational configuration to a database stored on the digital system, reading the operational configuration from the database and comparing the operational configuration to a reference configuration, and identifying the digital system as being at risk of a future failure if at least one parameter of the operational configuration differs from the at least one same parameter of the reference configuration by more than a tolerance value.

18 Claims, 5 Drawing Sheets

USE OF OPERATIONAL CONFIGURATION PARAMETERS TO PREDICT SYSTEM FAILURES

BACKGROUND

The increase in the demand for computers and other digital systems, such as cell phones and personal digital assistants (PDAs), has resulted in a corresponding increase in the competition between systems manufacturers for market share. In order to better compete, manufacturers of such systems continue to develop techniques for testing systems in order to identify systems that have failed during the manufacturing process, thus improving the quality of the delivered products and furthering the reputation of the manufacturer. But such a reputation can also be damaged by systems that function at delivery, but fail shortly afterward, a failure sometimes referred to as "infant mortality." These infant mortality failures also result in additional expenditures in the form of warranty related servicing, repairs and/or replacements. To avoid shipping systems with such "latent" failures, techniques have been developed to test systems and identify what are sometimes referred to as "statistical outliers," wherein a given system passes a functional test, but differs significantly in its test results as compared to the statistical norm for a given group of manufactured systems. Depending on the nature and degree of the difference in the test results, it may be possible to correlate such statistical anomalies to future failures.

But the use of statistical testing anomalies as predictors of future failures can require that highly specialized testing be performed on each system during various stages of production, sometimes by sophisticated and expensive testing systems, adding to the overall production time and cost. Further, because each type of system may have a different configuration or design, unique testing systems and programs may have to be developed for each platform, adding to the overall product development time and cost as well.

BRIEF DESCRIPTION OF THE DRAWINGS

For a detailed description of exemplary embodiments of the invention, reference will now be made to the accompanying drawings in which.

NOTATION AND NOMENCLATURE

Figure 1A:
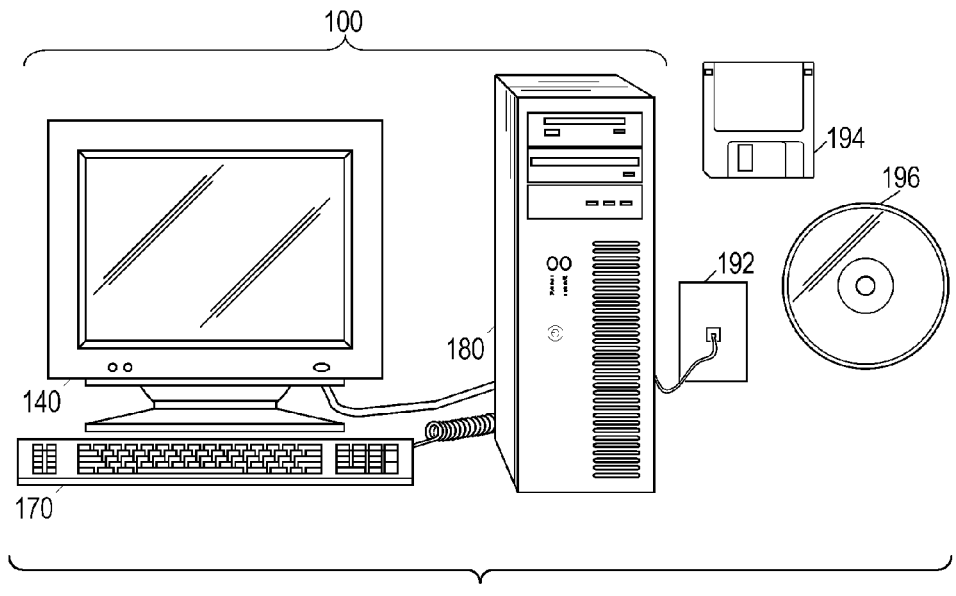
FIG. 1A shows an example of a system constructed in accordance with at least some illustrative embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Additionally, the term "system" refers to a collection of two or more hardware and/or software components, and may be used to refer to an electronic device, such as, for example, a computer, a portion of a computer, a combination of computers, etc. Further, the term "software" includes any executable code capable of running on a processor, regardless of the media used to store the software. Thus, code stored in non-volatile memory, and sometimes referred to as "embedded firmware," is included within the definition of software. Also, the term "software" can include more than one program, and may be used to refer to a single program executing on a single processor, multiple programs executing on a single processor, and multiple programs executing on multiple processors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be illustrative of that embodiment, and not intended to intimate that the scope of the disclosure, including the claims, is limited to that embodiment.

Many of today's digital systems achieve the high levels of performance required of such systems by dynamically adjusting parameters that control the timing and levels of signals of interfaces between different components of the system, particularly high-speed interfaces. Such calibration is sometimes accomplished by causing one component of the system to transmit and/or write a "training sequence" to another component within the system, and then reading back the sequence multiple times using differing configurations for the interface signals controlling the read operation. These training sequences are predetermined patterns designed to generate the types of signal transitions most likely to cause a system with marginal timing or marginal logic levels to fail (e.g., an alternating ones and zeros pattern). By identifying the range of configuration values that result in successful reads of the training sequence, a timing and level window (sometimes referred to as an "eye specification" or "eye mask") can be identified. This window allows the selection of optimal values that result in interface signals between the components that operate in the middle of the "eye," i.e., that result in read operations with the least likelihood of failure when compared against other configurations of the interface signals.

The calibration process described above is used to compensate for variations in the performance of electronic components that can result from variations in the manufacturing process of such components. The degree of compensation is indicative of the degree of variation of the performance of the component from a target performance. More significantly, an anomalous compensation value, i.e., one that deviates significantly from the norm as compared to other similar components, may be indicative of a defective component, even if the component does not fail a functional test. Such a defect may reflect a weakness in the structure of the component that may later result in an actual functional failure. Such a defect is sometimes referred to as a "latent" defect.

By collecting the calibrated configuration parameter values from a large number of similar systems, it is possible to determine a statistical norm for the parameters within a population of systems, and to correlate statistically significant variations from the norm, for each parameter, to later occurring systems failures. Once the correlation is established, anomalous parameter variations (sometimes referred to as "statistical outliers") may be used to identify systems that are at risk of future failures. By identifying systems that are likely to fail in the future, a system manufacturer can avoid shipping products with latent defects that may later cause increased customer dissatisfaction, and further avoid the increased costs of doing business that can result from warranty repairs and replacements.

Figure 1B:
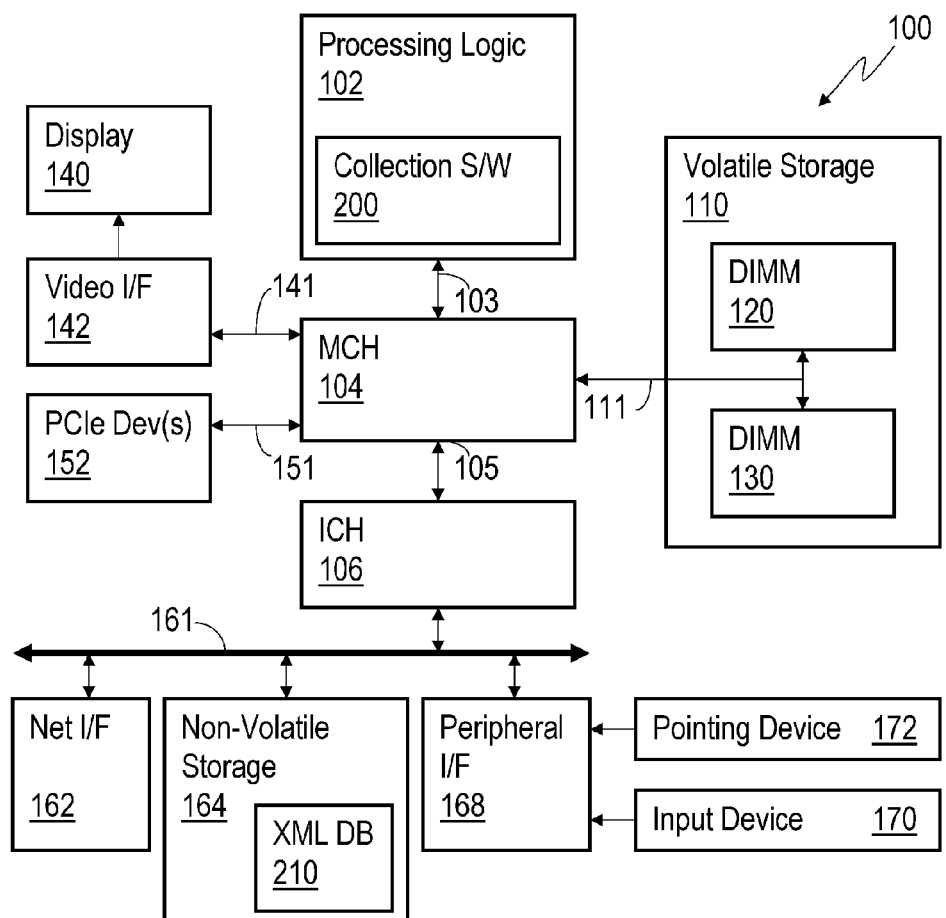
FIG. 1B shows a block diagram of the system of FIG. 1A, constructed in accordance with at least some illustrative embodiments.

FIGS. 1A and 1B show an illustrative computer system 100 suitable for providing the configuration parameter data needed to predict a failure of computer system 100. As shown, the illustrative computer system 100 comprises a chassis 180, a display 140, and an input device 170. The computer system 100 comprises a processing logic 102, volatile storage 110, and non-volatile storage 164. Processing logic 102 may be implemented in hardware (e.g., a microprocessor), software (e.g., microcode), or a combination of hardware and software. Volatile storage 110 comprises a computer-readable medium such as random access memory (RAM). Non-volatile storage 164 comprises a computer-readable medium such as flash RAM, read-only memory (ROM), a hard disk drive, a floppy disk (e.g., floppy 194), a compact disk read-only memory (CD-ROM, e.g., CD 196), and combinations thereof.

The computer-readable media of both volatile storage 110 and non-volatile storage 164 comprise, for example, software that is executed by processing logic 102 and provides the computer system with some or all of the functionality described herein. The computer system 100 also comprises a network interface (Net I/F) 162 that enables the computer system 100 to receive information via a local area network and/or a wired or wireless wide area network, represented in the example of FIG. 1A by Ethernet jack 192. A video interface (Video I/F) 142 couples to the display 140. A user interacts with the station via the input device 170 (e.g., a keyboard) and/or pointing device 172 (e.g., a mouse), which couples to a peripheral interface 168. The display 140, together with the input device 170 and/or the pointing device 172, may operate together as a user interface.

Computer system 100 may be a bus-based computer, with a variety of busses interconnecting the various elements shown in FIG. 1B through a series of hubs or bridges, including memory controller hub (MCH) 104 (sometimes referred to as a "north bridge") and interface controller hub (ICH) 106 (sometimes referred to as a "south bridge"). The busses of the illustrative example of FIG. 1B include: front-side bus 103 coupling processing logic 102 to MCH 104; accelerated graphics port (AGP) bus 141 coupling video interface 142 to MCH 104; peripheral component interconnect (PCI) bus 161 coupling network interface 162, non-volatile storage 164, peripheral interface 168 and ICH 106 to each other; PCI express (PCIe) bus 151 coupling one or more PCI express devices 152 to MCH 104; and memory bus 111 coupling MCH 104 to dual inline memory modules (DIMMs) 120 and 130 within volatile storage 110.

The peripheral interface 168 accepts signals from the input device 170 and other input devices such as a pointing device 172, and transforms the signals into a form suitable for communication on PCI bus 161. The video interface 142 may comprise a graphics card or other suitable video interface that accepts information from the AGP bus 141 and transforms it into a form suitable for the display 140. The processing logic 102 gathers information from other system elements, including input data from the peripheral interface 168, and program instructions and other data from non-volatile storage 164 or volatile storage 110, or from other systems (e.g., a server used to store and distribute copies of executable code) coupled to a local area network or a wide area network via the network interface 162. The processing logic 102 executes the program instructions (e.g., collection software 200) and processes the data accordingly. The program instructions may further configure the processing logic 102 to send data to other system elements, such as information presented to the user via the video interface 142 and the display 140. The network interface 162 enables the processing logic 102 to communicate with other systems via a network (e.g., the Internet). Volatile storage 110 may serve as a low-latency temporary store of information for the processing logic 102, and non-volatile storage 164 may serve as a long term (but higher latency) store of information (e.g., extended markup language (XML) database 210).

The processing logic 102, and hence the computer system 100 as a whole, operates in accordance with one or more programs stored on non-volatile storage 164 or received via the network interface 162. The processing logic 102 may copy portions of the programs into volatile storage 110 for faster access, and may switch between programs or carry out additional programs in response to user actuation of the input device 170. The additional programs may be retrieved from non-volatile storage 164 or may be retrieved or received from other locations via the network interface 162. One or more of these programs executes on computer system 100, causing the computer system to perform at least some functions disclosed herein.

Figure 2A:
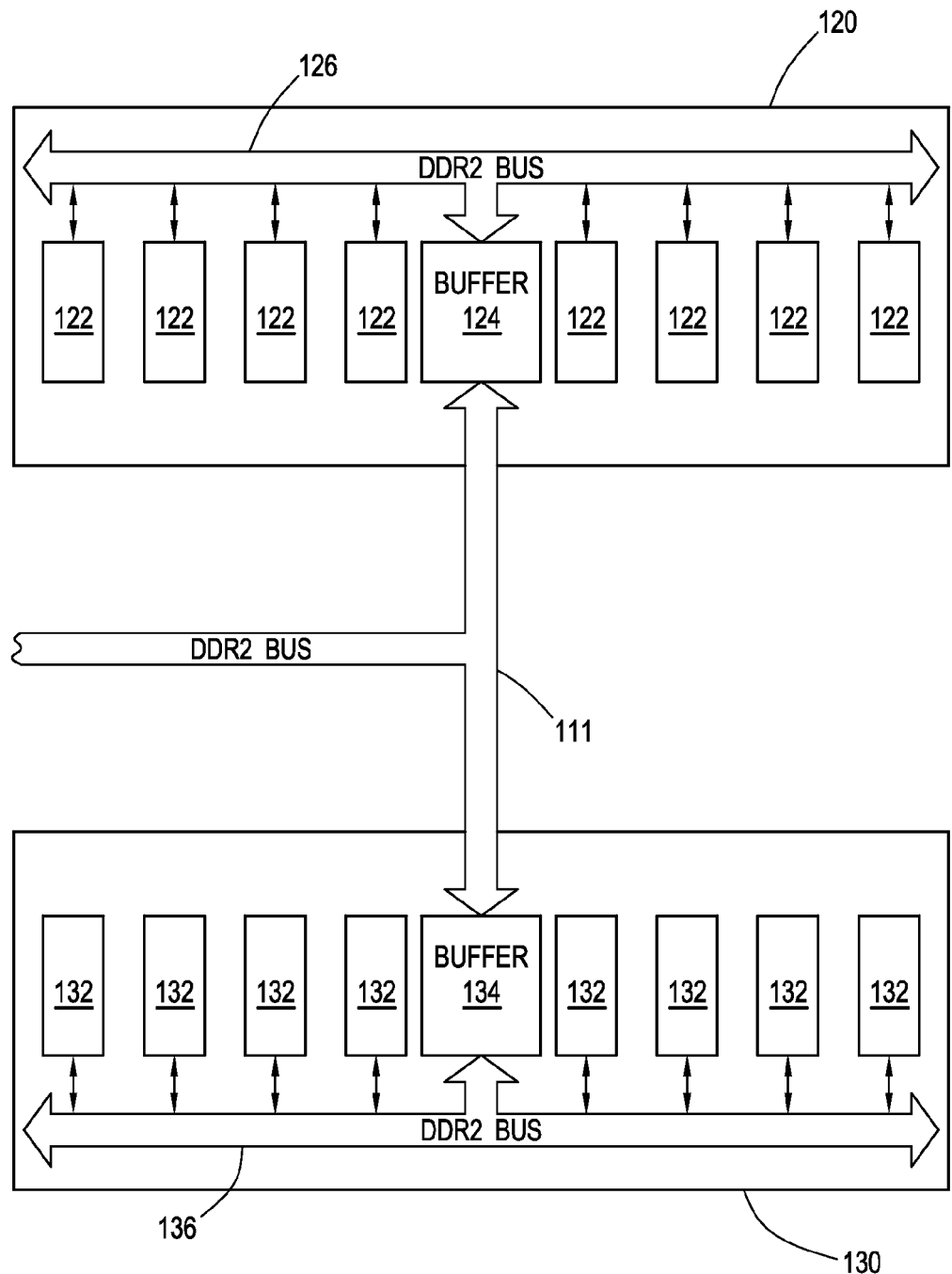
FIGS. 2A and 2B show different memory and memory bus configurations, suitable for use with the system of FIGS. 1A and 1B, in accordance with at least some illustrative embodiments.

In at least some illustrative embodiments of the computer system 100 of FIG. 1B, the memory bus 111 comprises a double data rate, version 2, (DDR2) memory bus, which couples MCH 104 to the individual memories 122 and 132 within DIMMs 120 and 130 through buffers 124 and 134 as shown in FIG. 2A. Buffers 124 and 134 within DIMMS forward signals from DDR2 memory bus 111 to DDR2 busses 126 and 136 within DIMMs 120 and 130, respectively, and also conversely from DDR2 busses 126 and 136 to DDR2 memory bus 111. MCH 104, as part of the initialization sequence of computer system 100, writes a series of training sequences to DIMMS 120 and 130, reading each sequence back multiple times, using different timing delays on the read strobe (e.g., the DQS signal generated by the DDR DIMMs) for each read of the data from the DIMMs. After a range of delay values for the strobe that result in error free data being read back has been identified, a delay value in the middle of the window is selected as the configuration value for the read strobe. Those of ordinary skill in the art will recognize that other signals and transactions may be similarly calibrated using training sequences as described, and further that other characteristics such as the voltage level of the signals may also be similarly adjusted to determine an optimal operational configuration of the interface. All such signals, transactions and configurations are within the scope of the present disclosure.

Figure 2B:
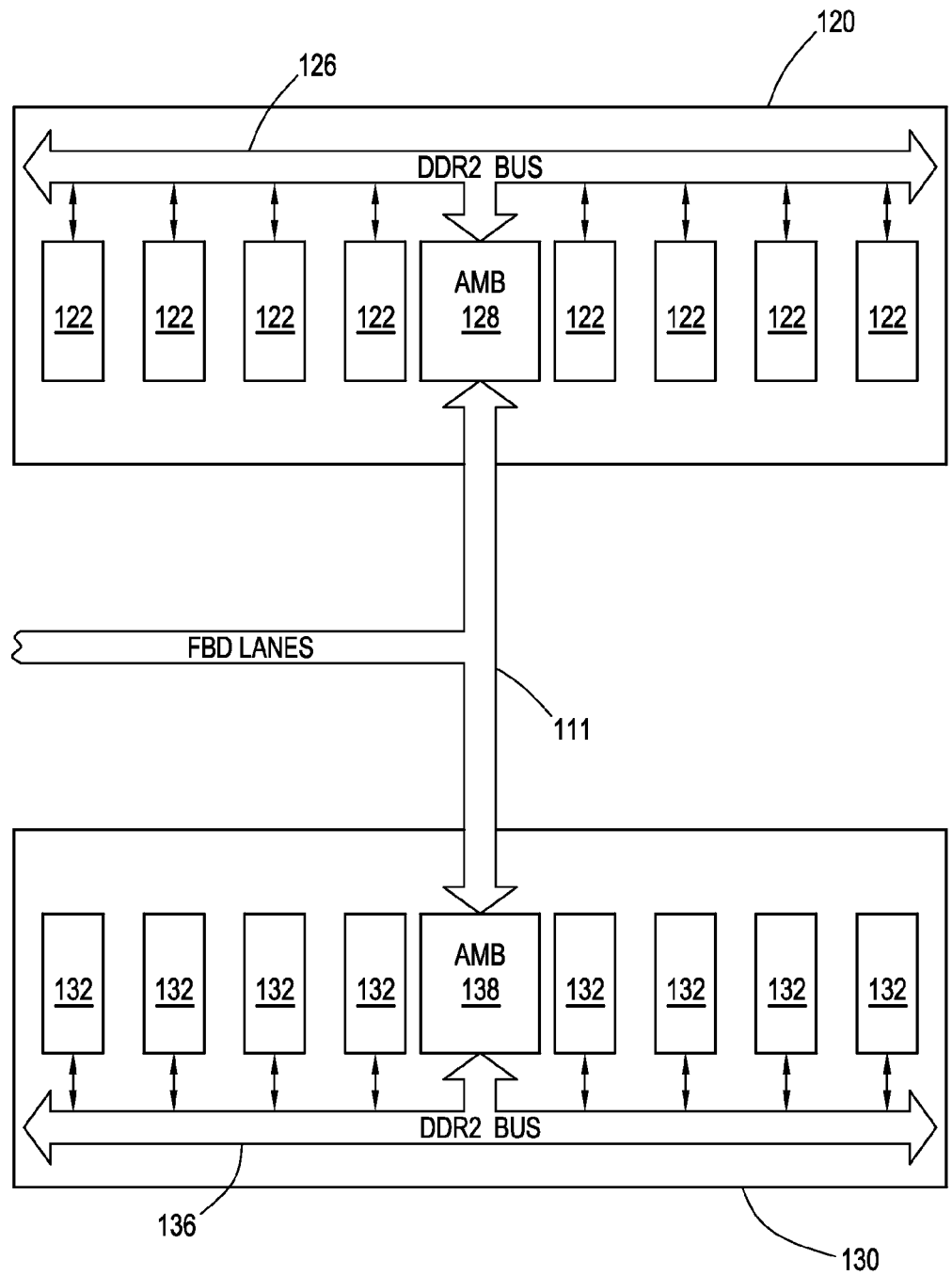

In other illustrative embodiments, memory bus 111 comprises fully buffered DIMM (FDB) lanes that couple the MCH 104 of FIG. 1B to advanced memory buffer (AMB) chips 128 and 138, respectively, within DIMMs 120 and 130, as shown in FIG. 2B. The AMB chips 128 and 138 couple to each of the individual memories 122 and 132 of DIMMS 120 and 130 via DDR2 busses 126 and 136 as shown. AMB chips 128 and 138 also calibrate the DDR2 interface using training sequences as described above, and as a result an optimal operational configuration of the AMB interface to the individual memories 122 and 132 is also determined. Those of ordinary skill will recognize that other interfaces may similarly be calibrated using training sequences (e.g., the interface to PCI express devices 152), and all such interfaces are within the scope of the present disclosure.

Once operational configuration parameters have been determined for an interface, the parameters may be used as a basis for statistically determining a range of normal values for such parameters, what constitutes a statistically significant deviation (statistical outliers) relative to such a range of normal values, and what deviations correlate to future failures of the computer system 100. Once the initial statistical processing is complete, the results of the statistical processing can be used to identify computer systems, such as computer system 100 that are at risk of future failures.

Figure 3A:
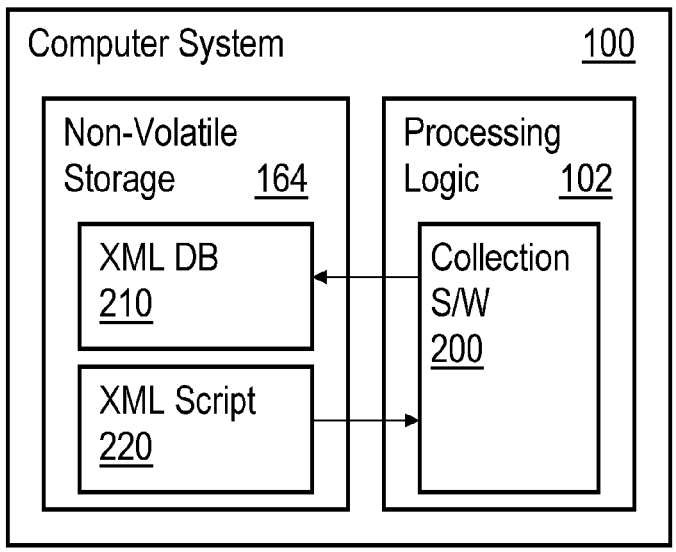
FIGS. 3A, 3B and 3C show the flow of operational configuration data, collected, processed and used to identify systems at risk of future failures, in accordance with at least some illustrative embodiments.
Figure 3B:
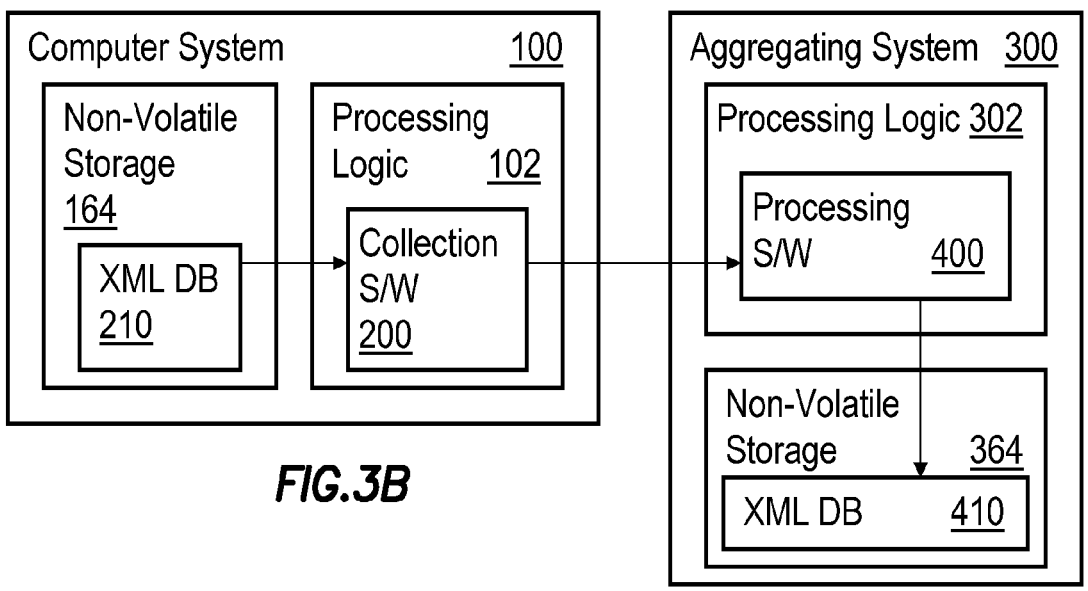
Figure 3C:
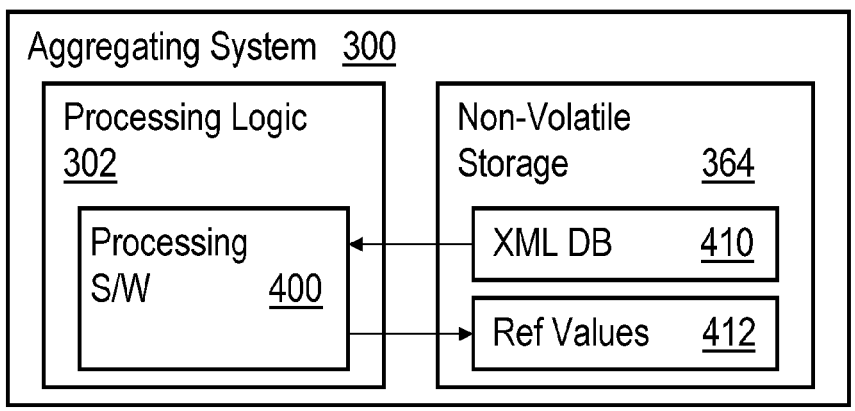

FIGS. 3A through 3C illustrates how operational configuration parameters determined during the initialization of multiple computer systems 100 are collected within each computer system, are further collected from the computer system 100 and stored on another similar computer system (hereinafter, the "Aggregating System"), are statistically processed to determine ranges of normal operation as well as limits defining statistical outliers, and are used to generate reference values used to subsequently identify computer systems at risk of future failure.

Referring to the illustrative embodiment of FIG. 3A, after computer system 100 completes its initialization sequence, collection software 200 executes on processing logic 102 and collects one or more operational configuration parameters determined at initialization. The parameters that are collected are determined based upon the content of XML parser script 220, which includes a list of the parameters to be collected by collection software 200, information as to where the parameters can be located within the system (e.g., the PCI address of a register within MCH 104 of FIG. 1), and information describing the format of the data. In at least some illustrative embodiments, the collected operational configuration parameter data, as well as the XML description of the data, are saved within XML database (XML DB) 210. By using XML parser script to describe the data to be collected, collection software 200 does not need to include hard-coded descriptions of the collected parameters. If the format of the parameter data later changes, or if the list of parameters selected for collection changes, XML parser script 220 can be easily modified without the need to change collection software 200.

Referring to FIG. 3B, once the operational configuration parameters have been collected and saved to XML database 210, communication is established between Aggregating System 300 and computer system 100, allowing the collected parameters within XML database 210 to be transferred to, and stored within, XML database 410 which is maintained on non-volatile storage 364 of Aggregating System 300. Aggregating System 300 comprises an architecture similar to that of computer system 100 shown in FIG. 1B, but executes processing software 400 on processing logic 302. Further, XML database 410 on Aggregating System 300 stores the operational configuration parameters for multiple computer systems such as computer system 100, as well as the results of one or more statistical analyses of the configuration data from multiple systems.

In the illustrative embodiment of FIG. 3B, processing software 400 of Aggregating System 300 communicates with computer system 100 by interacting with collection software 200, thus gaining access to the operational configuration parameters associated with computer system 100 and stored in XML database 210. In other illustrative embodiments, processing software 400 interacts with other software to access XML database 210, and in still other illustrative embodiments processing software 400 accesses XML database through one or more shared network file systems made accessible by an operating system (not shown) executing on computer system 100. Further, the physical connection between computer system 100 and Aggregating System 300 may be a dedicated wired connection (e.g., a universal serial bus (USB) connection), a dedicated wireless connection (e.g., a Bluetooth connection), a wired network connection (e.g., an Ethernet connection), or a wireless network connection (e.g., a WiFi connection). Other mechanism and connections for transferring the operational configuration parameters from computer system 100 to Aggregating System 300 will become apparent to those skilled in the art, and all such mechanisms and connections are within the scope of the present disclosure.

In at least some illustrative embodiments, the process of collecting operational configuration parameters shown in FIG. 3A, and of transferring the collected parameters to Aggregating System 300 as shown in FIG. 3B, is repeated for multiple computer systems 100. Statistical outliers and system failures are identified, tracked and saved within XML database 410. When enough data has been collected to identify at least one statistically significant correlation between system failures and statistical outliers associated with a given parameter, a set of reference values 412 are created and saved on non-volatile storage 364, as shown in FIG. 3C. The set of reference values comprises a statistical reference parameter value (e.g., the mean value of an operational configuration parameter), and a tolerance value above and below the reference parameter value. The tolerance value establishes a limit beyond which an anomalous operational configuration value will be treated as indicative of an unacceptable risk of a future system failure. The tolerance value may be based, for example, on such statistical measures as the standard deviation of a dataset of parameter values (e.g., a tolerance value of three-sigma referenced to the mean value of a parameter). If more than one operational configuration parameter is identified as a good predictor of future failures of the computer system, a subset of one or more parameters with better correlations than other parameters are selected as the parameters used in the comparison with the reference values. A computer system 100 that generates at initialization one or more operational configuration parameter values that exceed the statistical norm by more than the tolerance values is identified as defective, and not, for example, shipped to the customer.

In at least some illustrative embodiments, the reference values are generated once from a sample set of computer systems 100 and used for all subsequent evaluations of computer systems 100 without further updates to the reference values. In other illustrative embodiments, the reference values are periodically updated as new data is collected from computer systems 100 and the systems are evaluated. In still other illustrative embodiments the reference values are periodically updated, but data is maintained separately for distinct production runs of the manufacture of computer systems 100, or for a particular production facility. Other combinations of updating, combining and segregating reference values will become apparent to those of ordinary skill in the art, and all such techniques are within the scope of the present disclosure.

By using operational configuration parameter values to evaluate the risk of a future failure of the system, the system can be evaluated in a non-invasive manner without interrupting the normal operation of computer system 100, once it is shipped to the customer and placed into operation. This is due at least in part to the fact that it is not necessary to run dedicated test programs, nor to generate and/or write test patterns that can disrupt the configuration of the system and destroy information in memory. The operational configuration parameter values are determined automatically at power-up as part of the normal initialization of the system, without the need for additional user intervention. The data is generated at that time and is thus available for later collection as described herein.

In at least some illustrative embodiments, a technical service representative can evaluate the computer system 100 by establishing a remote connection between computer system 100 and Aggregating System 300. Once the remote connection is established, the collection software is executed on computer system 100 and the current operational configuration parameters are collected and sent to Aggregating System 300. An archived copy of the reference data for the original production run, of which computer system 100 was a part, is retrieved and used to determine if the computer system 100 is utilizing operational configuration parameter values that exceed the norm by more than the tolerance value, or if changes over time in the operational configuration parameter values (referenced to archived values for the particular computer system 100) exceed the norm for changes of the same parameter for the production group by more than a tolerance value established for the production group. In this manner, the technical service representative can determine if a latent failure is developing, allowing the system to be repaired or replace before an actual failure occurs.

Figure 4:
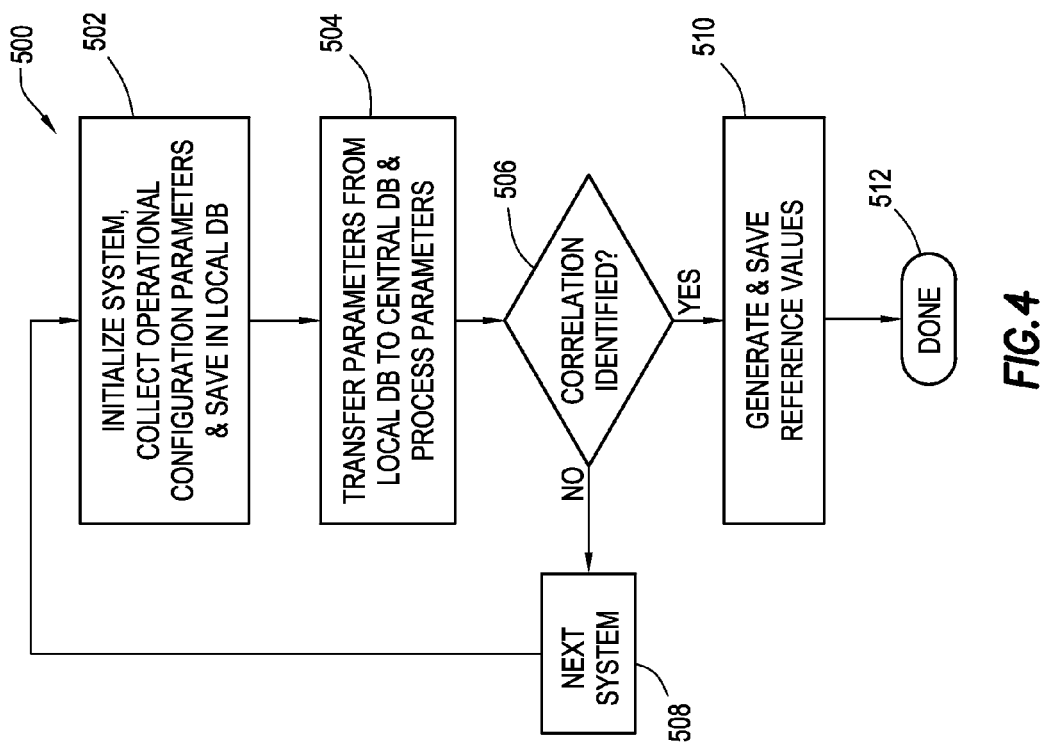
FIG. 4 shows a method for collecting and processing operational configuration data and for generating reference values, in accordance with at least some illustrative embodiments.

FIG. 4 shows a method 500 for collecting and processing operational configuration parameter values of a computer system, and for generating one or more sets of reference values, in accordance with at least some illustrative embodiments. Referring to FIGS. 3A through 3C and FIG. 4, after completing initialization of a computer system (e.g., computer system 100) and determining a set of operational configuration parameters for the computer system, the operational configuration parameters are collected and saved in a local database (e.g., XML DB 210) on the computer system (block 502). The collected parameters are subsequently transferred from the local database to a centralized collection database (e.g., XML DB 410), where the parameters are combined with previously collected parameters from other similar computer systems and statistically processed (e.g., calculating mean values and standard deviations of the data collected), as shown in block 504 of FIG. 4.

If enough data has been collected from enough systems to identify a statistically significant correlation between statistical outlier parameter values and identified system failures (block 506), reference values (including statistical values such as the mean and standard deviation for each parameter, as well as tolerance values for each parameter) are generated and saved in the centralized database (block 510), completing the method. If a correlation is not identified (block 506), another computer system is selected (block 508) and the data collection and processing (blocks 502 through 506) is repeated.

Figure 5:
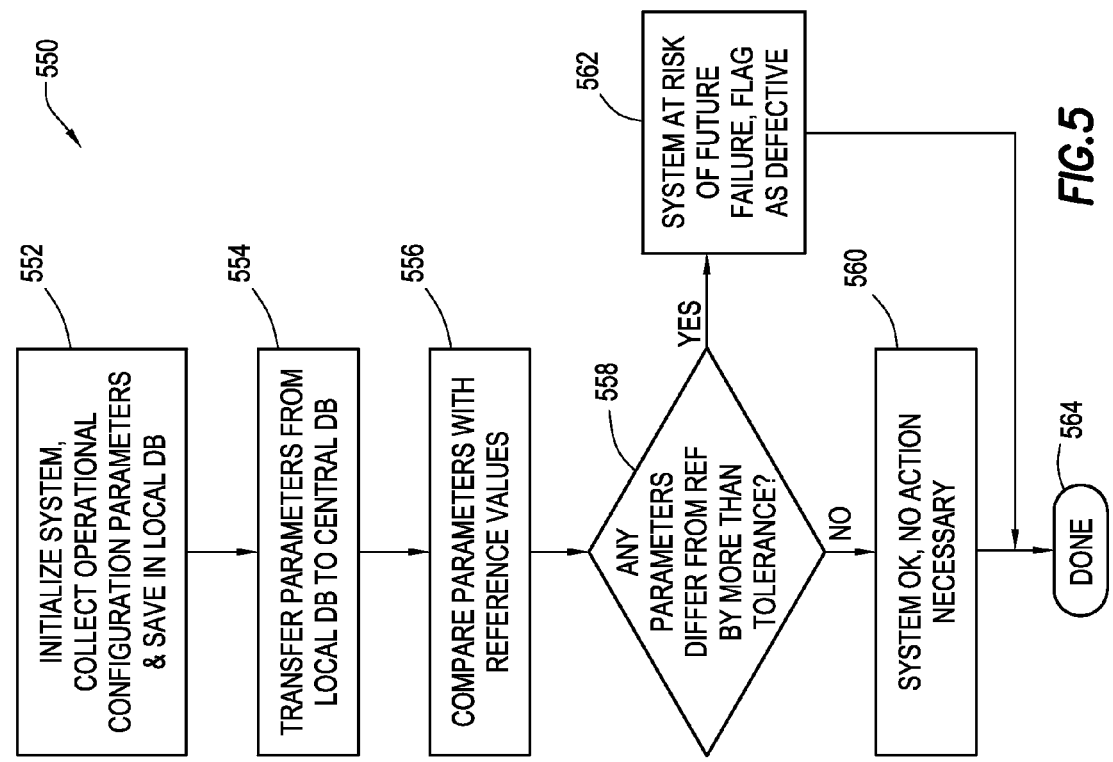
FIG. 5 shows a method for using operational configuration data to identify systems at risk of future failures, in accordance with at least some illustrative embodiments.

FIG. 5 shows a method for using operational configuration parameter values to identify computer systems at risk for future failures, in accordance with at least some illustrative embodiments. Referring to FIGS. 3A through 3C and FIG. 5, after completing initialization of a computer system (e.g., computer system 100) and determining a set of operational configuration parameters for the computer system, the operational configuration parameters are collected and saved in a local database (e.g., XML DB 210) on the computer system (block 552). The collected parameters are subsequently transferred to a centralized collection database (e.g., XML DB 410) from the local database (block 554) where one or more selected parameters are compared to a set of reference values that includes tolerance values referenced to a set of statistical norms for each parameter (block 556). If none of the selected parameters differs from the statistical norm for the parameter by more than a tolerance value also associated with the selected parameter (block 558), no action is necessary (block 560) ending the method (block 564). If at least one parameter exceeds its corresponding statistical norm by more than the corresponding tolerance value, the computer system that generated the operational configuration parameter value is identified as being at risk for a future failure, and is flagged as defective (block 562), ending the method (block 564).

The above discussion is meant to be illustrative of the principles and various embodiments of the present invention. Numerous variations and modifications will become apparent to those skilled in the art once the above disclosure is fully appreciated. For example, although the embodiments described collect operational configuration parameters from bus bridges and device interfaces, other sources may be used to obtain operational configuration parameters, such as, for example, advanced configuration and power interface registers associated with restoring the state of computer system 100 upon exiting a global sleep state (e.g., ACPI S3 restore registers). Also, although the databases of the illustrative embodiments described utilize XML databases, other embodiments may utilize non-XML databases. Further, although computer systems are described in the illustrative embodiments, those of ordinary skill in the art will recognize that the systems and methods described may be implemented in a wide variety of digital systems, including cellular telephones, PDAs, digital televisions, MP3 players, and digital cameras, just to name a few examples. It is intended that the following claims be interpreted to embrace all such variations and modifications.

What is claimed is:

1. A method, comprising:
   initializing a digital system, the initializing comprising determining an operational configuration of at least part of the digital system;
   saving the operational configuration to a database stored on the digital system;
   reading the operational configuration from the database and comparing the operational configuration to a reference configuration; and
   identifying the digital system as being at risk of a future failure if at least one parameter of the operational configuration differs from the at least one same parameter of the reference configuration by more than a tolerance value;
   wherein determining the operational configuration comprises:
      a controller within the digital system writing training sequence data to a device;
      the controller performing one or more reads from the device of the training sequence data, the controller configured using a distinct configuration of a plurality of configurations for each of the one or more reads; and
      the controller selecting the operational configuration from one of the plurality of configurations associated with a successful read.

2. The method of claim 1, further comprising:
   collecting a plurality of operational configurations each corresponding to a distinct digital system of a plurality of digital systems; and
   defining each parameter of the reference configuration as a statistical combination of the corresponding parameters from each of the plurality of configurations.

3. The method of claim 2, wherein defining each parameter of the reference configuration comprises calculating the mean value of the corresponding parameters.

4. The method of claim 2, further comprising defining the tolerance value as a multiple of a standard deviation referenced to the statistical combination of the corresponding parameters.

5. The method of claim 2, further comprising:
   identifying, as statistical outliers, values of a parameter from a subset of the plurality of operational configurations that each differ by more than the tolerance value from a calculated statistical norm associated with the same parameter for the plurality of operational parameters;

correlating the statistical outliers to actual system failures; and selecting, as the at least one same parameter, one or more parameters from the subset comprising parameters with correlations to the actual system failures higher than correlations of other remaining parameters from the subset.

6. The method of claim 2, further comprising:

identifying, as statistical outliers, changes over time in the values of a parameter from a subset of the plurality of operational configurations that each differ by more than the tolerance value from a calculated statistical norm associated with changes over time in the same parameter for the plurality of operational parameters;

correlating the statistical outliers to actual system failures; and selecting, as the at least one same parameter, one or more parameters from the subset comprising correlations to the actual system failures higher than correlations of other remaining parameters from the subset.

7. A system, comprising:

processing logic; and a non-volatile storage device coupled to the processor;

wherein the processing logic initializes a configuration of the system and stores at least part of the configuration in a database stored on the non-volatile storage device; and wherein the processing logic retrieves and makes available stored configuration data for comparison with at least part of a reference configuration to determine if the system is at risk of a future failure;

wherein the system further comprises advanced configuration and power interface (ACPI) registers associated with restoring the system state upon exiting the ACPI global sleep state (ACPI S3 Restore Registers), and wherein the stored configuration comprises values stored in the ACPI S3 Restore Registers.

8. The system of claim 7, further comprising:

a memory subsystem coupled to the processing logic and comprising volatile memory;

a first bridge coupled to the processing logic, to the volatile memory, and to a first bus; and a second bridge coupled to the first bridge and to a second bus coupled to the non-volatile storage device.

9. The system of claim 8, wherein the first bridge comprises a memory controller hub (MCH), and wherein the stored configuration data comprises values stored in registers within the MCH.

10. The system of claim 8, wherein the memory subsystem further comprises an advanced memory buffer (AMB) chip, and wherein the stored configuration data comprises values stored in registers within the AMB chip.

11. The system of claim 8, wherein the first bridge comprises a peripheral component interconnect express (PCIe) interface, and wherein the stored configuration data comprises values stored in registers within the PCIe interface.

12. The system of claim 7 wherein the database comprises an extended markup language (XML) database.

13. A computer-readable medium comprising software that causes a first processor to:

cause a controller within the system to write training sequence data to a device;

cause the controller to perform one or more reads from the device of the training sequence data, the controller configured using a distinct configuration of a plurality of configurations for each of the one or more reads; and cause the controller to select the operational configuration from one of the plurality of configurations associated with a successful read compare the selected operational configuration to a reference configuration, wherein said operational configuration includes at least one parameter that is configured during initialization of said system; and identify the system as being at risk of a future failure if at least one parameter of the operational configuration differs from the at least one same parameter of the reference configuration by more than a tolerance value.

14. The computer-readable medium of claim 13, wherein the software further causes a second processor to:

save the selected operational configuration to a database stored on the system.

15. The computer-readable medium of claim 14, wherein the software further causes the second processor to:

collect a plurality of operational configurations each corresponding to a distinct system of a plurality of systems; and define each parameter of the reference configuration as a statistical combination of the corresponding parameters from each of the plurality of configurations.

16. The computer-readable medium of claim 15, wherein the software causes the second processor to define each parameter of the reference configuration by at least calculating the mean value of the corresponding parameters.

17. The computer-readable medium of claim 15, wherein the software further causes the second processor to define the tolerance value as a multiple of a standard deviation referenced to the statistical combination of the corresponding parameters.

18. The computer-readable medium of claim 15, wherein the software further causes the second processor to:

identify, as statistical outliers, values of a parameter from a subset of the plurality of operational configurations that each differs by more than the tolerance value from a calculated statistical norm associated with the same parameter for the plurality of operational parameters;

correlate the statistical outliers to actual system failures; and select, as the at least one same parameter, one or more parameters from the subset comprising correlations to the actual system failures higher than correlations of other remaining parameters from the subset.

* * * * *